(12) United States Patent
Lee

(10) Patent No.: US 10,061,121 B2
(45) Date of Patent: Aug. 28, 2018

(54) OPTICAL STRUCTURE FOR VEHICLE

(71) Applicant: HYUNDAI MOBIS CO., LTD., Seoul (KR)

(72) Inventor: Hyun Soo Lee, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 404 days.

(21) Appl. No.: 14/523,531

(22) Filed: Oct. 24, 2014

(65) Prior Publication Data

US 2016/0061398 A1 Mar. 3, 2016

(30) Foreign Application Priority Data

Aug. 26, 2014 (KR) .................. 10-2014-0111244

(51) Int. Cl.
| | | |
|---|---|---|
| *F21V 7/00* | (2006.01) | |
| *G02B 27/00* | (2006.01) | |
| *F21S 41/147* | (2018.01) | |
| *F21S 41/24* | (2018.01) | |
| *F21S 41/255* | (2018.01) | |
| *F21S 41/32* | (2018.01) | |
| *F21S 41/43* | (2018.01) | |
| *F21S 41/663* | (2018.01) | |

(52) U.S. Cl.
CPC ........ *G02B 27/0012* (2013.01); *F21S 41/147* (2018.01); *F21S 41/24* (2018.01); *F21S 41/255* (2018.01); *F21S 41/322* (2018.01); *F21S 41/43* (2018.01); *F21S 41/663* (2018.01)

(58) Field of Classification Search
CPC ........ F21S 48/1225; F21S 48/13; F21S 41/24; F21S 41/663; F21S 41/147; F21S 41/322; F21S 41/255; F21S 41/43; G02B 27/0012
USPC .......................................................... 362/516
See application file for complete search history.

(56) References Cited

U.S. PATENT DOCUMENTS

| | | | | |
|---|---|---|---|---|
| 5,440,428 | A | * | 8/1995 | Hegg .................. B60K 37/02 345/7 |
| 7,988,345 | B2 | * | 8/2011 | Rosenhahn .......... F21S 48/1154 362/521 |
| 2010/0002460 | A1 | | 1/2010 | Rosenhahn et al. |
| 2012/0106200 | A1 | * | 5/2012 | Yin ...................... G02B 17/004 362/615 |

FOREIGN PATENT DOCUMENTS

| | | |
|---|---|---|
| CN | 103672664 A | 3/2014 |
| JP | 2009-59700 A | 3/2009 |
| KR | 10-1230132 B1 | 2/2013 |
| KR | 10-2014-0040631 A | 4/2014 |
| KR | 10-1381862 B1 | 4/2014 |

* cited by examiner

*Primary Examiner* — Andrew Coughlin
*Assistant Examiner* — Meghan Ulanday

(57) ABSTRACT

The present invention provides an optical structure for a vehicle, including: an optic unit which is configured by a plurality of optics; a lens which is provided with an interval from the optic unit; and a shield which is provided between the optic unit and the lens to reflect light which passes through the optic toward the lens.

16 Claims, 8 Drawing Sheets

Fig. 9

| deg | deg | deg | mm | deg | mm | mm | mm | mm |
|---|---|---|---|---|---|---|---|---|
| 2x | x | y | h | x+y | k | t | X | Y |
| 45.92 | 22.96 | 1.00 | 0.37 | 23.96 | 21.24 | 21.24 | 3.42 | 0.6 |
| 43.92 | 21.96 | 2.00 | 0.78 | 23.96 | 22.30 | 22.32 | 35.3 | 1.2 |
| 41.92 | 20.96 | 3.00 | 1.23 | 23.96 | 23.46 | 23.49 | 36.4 | 1.9 |
| 39.92 | 19.96 | 4.00 | 1.73 | 23.96 | 24.72 | 24.78 | 37.7 | 2.6 |
| 37.92 | 18.96 | 5.00 | 2.28 | 23.96 | 26.61 | 26.19 | 39.0 | 3.4 |
| 35.92 | 17.96 | 6.00 | 2.90 | 23.96 | 27.61 | 27.76 | 40.5 | 4.3 |
| 33.92 | 16.96 | 7.00 | 3.60 | 23.96 | 29.29 | 31.46 | 42.2 | 5.2 |
| 31.92 | 15.96 | 8.00 | 4.38 | 23.96 | 31.16 | 31.16 | 44.0 | 6.2 |
| 29.92 | 14.96 | 9.00 | 5.27 | 23.96 | 33.26 | 33.68 | 46.1 | 7.3 |
| 27.92 | 13.96 | 10.00 | 6.29 | 23.96 | 35.65 | 36.20 | 48.5 | 8.5 |
| 25.92 | 12.96 | 11.00 | 7.46 | 23.96 | 38.38 | 39.10 | 51.1 | 9.9 |
| 23.92 | 11.96 | 12.00 | 8.83 | 23.96 | 41.55 | 42.48 | 54.3 | 11.5 |
| 21.92 | 10.96 | 13.00 | 10.45 | 23.96 | 45.27 | 46.46 | 57.9 | 13.4 |
| 19.92 | 9.96 | 14.00 | 12.40 | 23.96 | 49.72 | 51.24 | 62.3 | 15.5 |
| 17.92498 | 8.96 | 15.00 | 14.76965 | 23.96249 | 55.12108 | 57.06554 | 67.7 | 18.1 |
| 15.92498 | 7.96 | 16.00 | 17.7356 | 23.96249 | 61.85138 | 64.34396 | 74.3 | 21.3 |
| 13.92498 | 6.96 | 17.00 | 21.5472 | 23.96249 | 70.47772 | 73.69797 | 82.9 | 25.3 |
| 11.92498 | 5.96 | 18.00 | 26.62859 | 23.96249 | 81.95438 | 86.17193 | 94.3 | 30.6 |
| 9.924978 | 4.96 | 19.00 | 33.74579 | 23.96249 | 98.0049 | 103.652 | 110.3 | 38.0 |
| 7.924978 | 3.96 | 20.00 | 44.43811 | 23.96249 | 122.0927 | 129.9283 | 134.3 | 48.9 |
| 5.924978 | 2.96 | 21.00 | 62.32328 | 23.96249 | 162.3577 | 173.9086 | 174.5 | 67.0 |
| 3.924978 | 1.96 | 22.00 | 98.39283 | 23.96249 | 243.5308 | 262.6564 | 255.6 | 103.3 |
| 1.924978 | 0.96 | 23.00 | 209.318 | 23.96249 | 493.1223 | 535.7085 | 505.1 | 214.4 |
| -0.07502 | (0.04) | 24.00 | -5591.39 | 23.96249 | -12558.5 | -13746.9 | -12546.6 | -5586.1 |
| -2.07502 | (1.04) | 25.00 | -210.026 | 23.96249 | -450.402 | -496.964 | -438.6 | -204.5 |
| -4.07502 | (2.04) | 26.00 | -110.898 | 23.96249 | -227.375 | -252.978 | -215.7 | -105.2 |
| -6.07502 | (3.04) | 27.00 | -76.9993 | 23.96249 | -151.12 | -169.606 | -139.5 | -71.1 |
| -8.07502 | (4.04) | 28.00 | -59.8606 | 23.96249 | -112.581 | -127.506 | -101.1 | -53.8 |
| -10.075 | (5.04) | 29.00 | -49.4993 | 23.96249 | -89.2991 | -102.101 | -77.9 | -43.2 |
| (12.08) | (6.04) | 30.00 | -42.5467 | 23.96 | (73.69) | (85.09) | -62.4 | -36.0 |
| (14.08) | (7.04) | 31.00 | -37.5486 | 23.96 | (62.49) | (72.90) | -51.3 | -30.9 |

OPTICAL STRUCTURE FOR VEHICLE

CROSS-REFERENCE TO RELATED APPLICATIONS

This application claims priority to and the benefit of Korean Patent Application No. 10-2014-0111244 filed in the Korean Intellectual Property Office on Aug. 26, 2014, the entire contents of which are incorporated herein by reference.

TECHNICAL FIELD

The present invention relates to an optical structure for a vehicle in which a size of an optical module is reduced so as to implement a thin and elongated head lamp.

BACKGROUND ART

In a projection optical system of the related art, when a lens is reduced, an efficiency may be degraded due to a ray which is not incident onto the lens but is leaked. The leaked light may be focused in an unintentional location, which may act as an obstruction from the point of view of a design or regulations. A current design trend of the head lamp is to implement a small-sized optical module and a thin and elongated head lamp.

However, when a thin aspherical lens is applied, a beam pattern as illustrated in FIG. 1 is formed due to light which is leaked outside the lens. Circular light which is illustrated at the center of FIG. 1 is focused light and semicircular light which is above and below the focused light is leaked light. Here, the thin aspherical lens refers to a lens in which a width in a vertical direction are smaller than that of a general semicircular lens due to upper and lower cut surfaces. In order to prevent the light from being leaked, as illustrated in FIG. 2, a target beam pattern having a width of 30 degrees needs to be set. That is, a required hot zone and a luminous intensity are selected using a primary optic to design the head lamp therefor.

In the meantime, as an example of an optic structure, Korean Patent Registration No. 1230132 discloses a head lamp for a vehicle in which a chemical machining process is performed on a rear surface of an optic processing unit to uniformly emit light from one LED onto the entire optic processing unit.

SUMMARY OF THE INVENTION

The present invention has been made in an effort to provide an optical structure for a vehicle in which a size of an optical module is reduced so as to implement a thin and elongated head lamp.

An exemplary embodiment of the present invention provides an optical structure for a vehicle, including: an optic unit which is configured by a plurality of optics; a lens which is provided with an interval from the optic unit; and a shield which is provided between the optic unit and the lens to reflect light which passes through the optic toward the lens.

A reflective surface which reflects the light which passes through the optic toward the lens may be provided on a top surface of the shield.

The optic unit may be configured such that three optics are disposed with an interval.

The lens may be an aspherical lens.

The lens may be a semicircular aspherical lens having upper and lower cut surfaces The optic may include a spherical curve which is provided on a rear surface of a conical optic; an entrance which is provided on an entire surface of an optic which is opposite to the spherical curve; and an aspherical curve which is provided in the entrance.

An outer surface of the optic forms a Bezier curve.

A diameter of a rear surface of the optic is 20 mm.

A width of the lens may be 70 mm to 80 mm

The optic may be formed to be tilted so that a center of the spherical curve faces a lens focal point.

A distance between a center of the front surface of the optic and the lens focal point may be determined by a value calculated by an operation.

A distance between the center of the front surface of the optic and the lens focal point may be calculated by the operation and the calculated value is applied to a table to determine a control range of the optic.

According to the optical structure for a vehicle according to an exemplary embodiment of the present invention, a size of the optical module may be reduced in accordance with the demand of a head lamp design trend.

Further, a thin head lamp may be implemented in accordance with the demand of a head lamp design trend.

BRIEF DESCRIPTION OF THE DRAWINGS

FIG. 9 is a table for a condition of restriction in a relationship between the optic according to an exemplary embodiment of the present invention and a lens focal point.

DETAILED DESCRIPTION OF THE INVENTION

Figure 1:
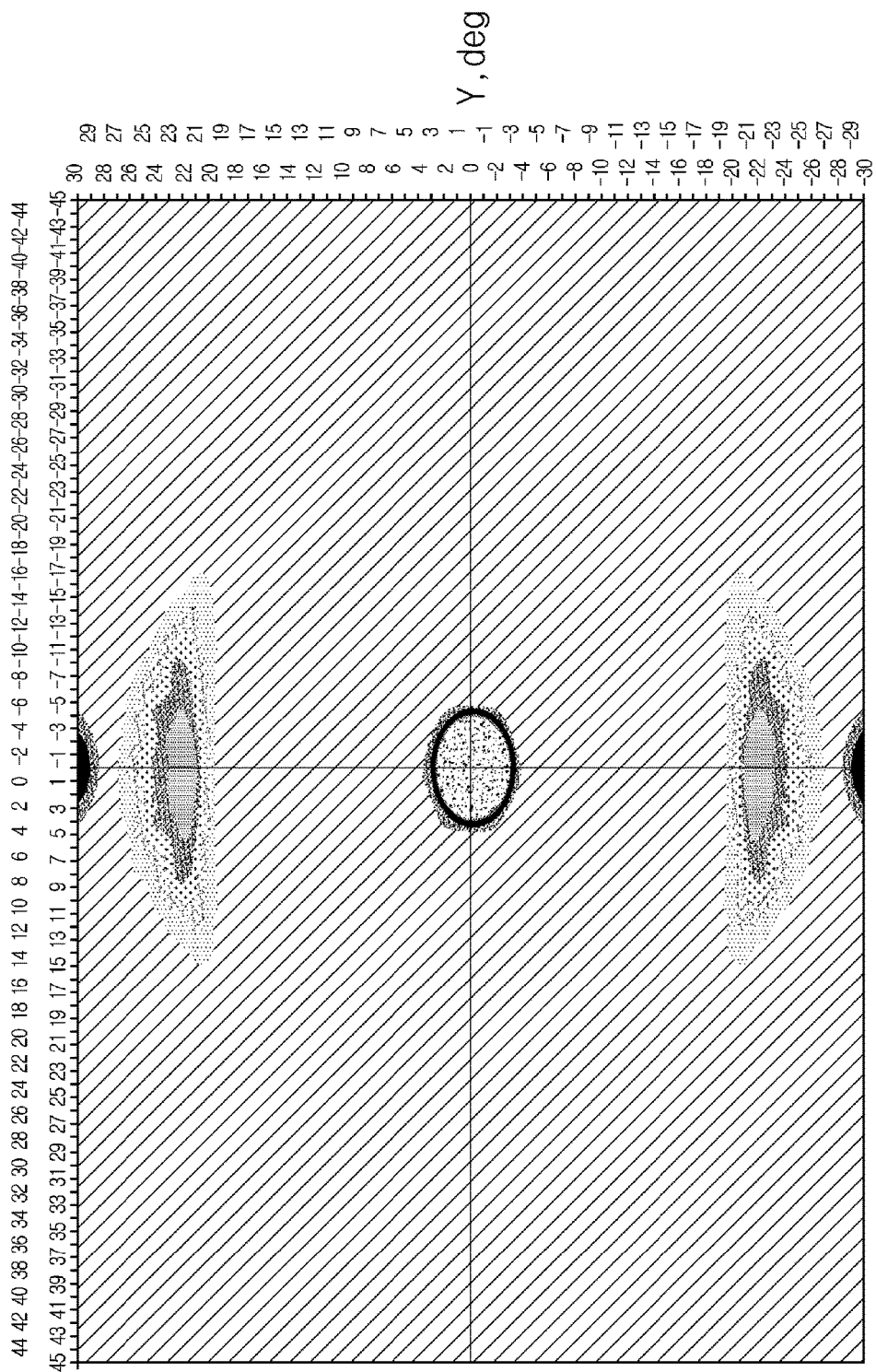
FIG. 1 is a view illustrating a beam pattern which is leaked outside the lens when a thin aspherical lens is applied.
Figure 2:
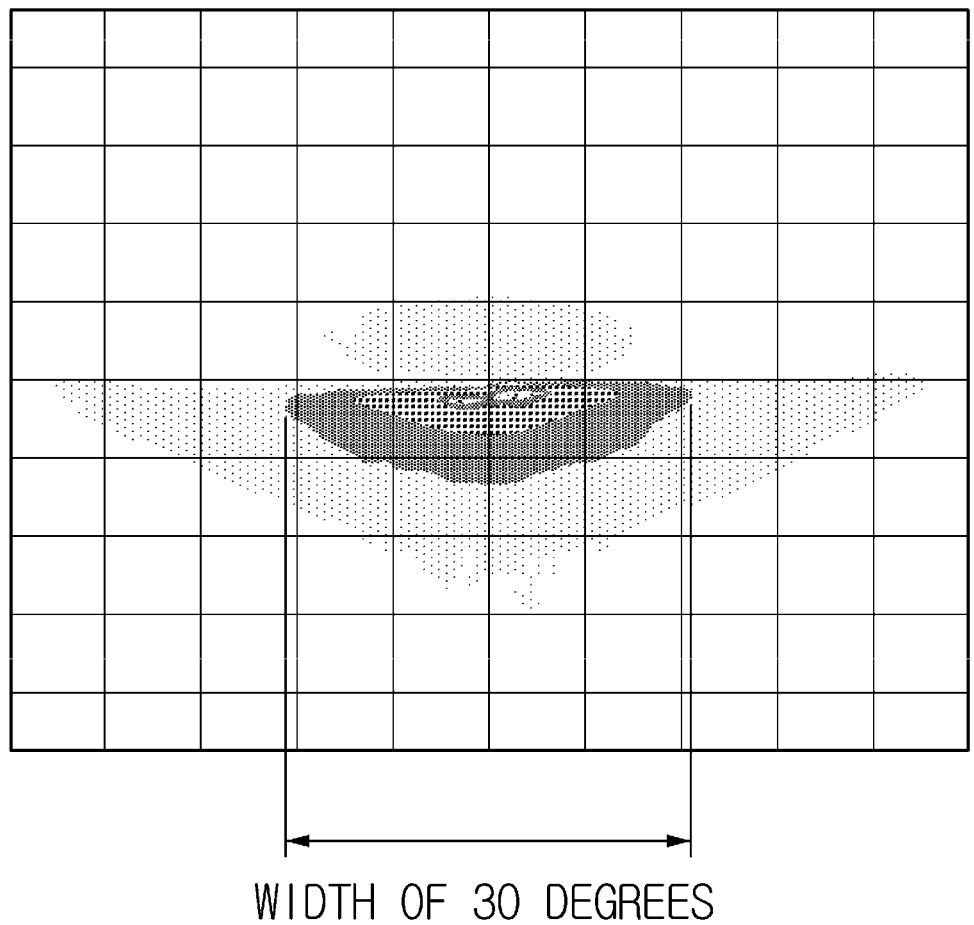
FIG. 2 is a view illustrating a target beam pattern.

Hereinafter, exemplary embodiments of the present invention will be described in detail with reference to the accompanying drawings. In the figures, it should be noted that even though the parts are illustrated in different drawings, it should be understood that like reference numerals refer to like parts of the present invention throughout the several figures of the drawing. Furthermore, hereinafter, exemplary embodiments of the present invention will be described. However, it should be understood that the technical spirit of the invention is not limited to the specific embodiments, but may be changed or modified in various ways by those skilled in the art.

An optical structure for a vehicle according to an exemplary embodiment of the present invention provides a low beam optical system by applying a primary optic in front of an LED which is a light source 60 in order to use a thin aspherical lens.

Figure 7:
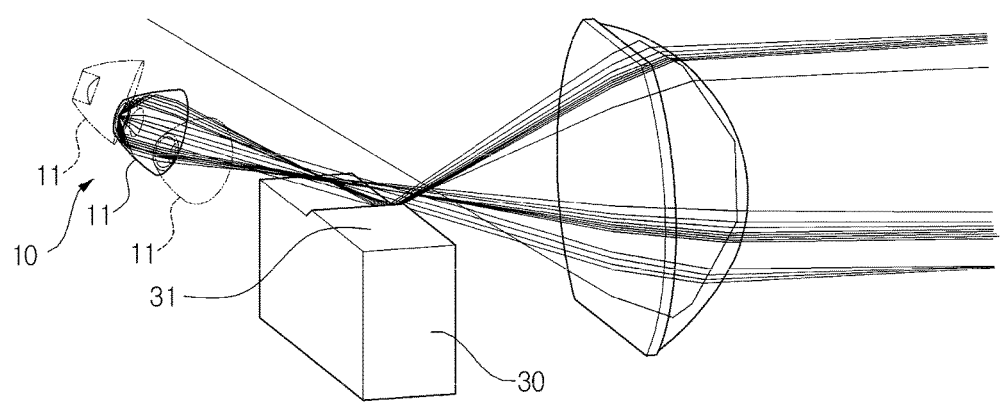
FIG. 7 is a view illustrating an optical structure for a vehicle according to an exemplary embodiment of the present invention.

FIG. 7 is a view illustrating an optical structure for a vehicle according to an exemplary embodiment of the present invention. As illustrated in FIG. 7, the optical structure for a vehicle according to an exemplary embodiment of the present invention includes an optic unit 10, an aspherical lens 20 which is provided at a rear side with an interval from the optic unit 10, and a shield 30 which is provided between the optic unit 10 and the lens 20.

Specifically, the optic unit 10 is configured by a combination of three optics 11. The three optics 11 of the optic unit 10 are disposed with a regular interval from each other. The optics 11 includes a spherical curve 111 which is provided on a rear surface of the optic 11 and an entrance 112 which is provided on a front surface of the optic 11. The optic 11 has a conical shape. The spherical curve 111 is provided on a rear surface of the optic 11 which is directed to the lens 20. The entrance 112 is formed so as to be dented on the front surface of the optic 11 which is opposite to the spherical curve 111. An aspherical curve 113 is formed in the entrance 112. An outer surface of the optic 11 is formed to form a Bezier curve. The light from the light source may be reflected onto the lens 20 by the Bezier curve. A diameter of the spherical curve 111 of the optic 11 may be 20 mm.

The lens 20 is an aspherical lens and is provided with an interval from the optic unit 10. The lens 20 has a semicircular lens shape in which cut surfaces 21 are provided on a upper side and a lower side so that a thickness in a vertical direction is smaller than that of a general lens. A width of the lens 20 may be 70 mm to 80 mm. The cut surfaces 21 are flat surfaces. A thin aspherical lens 20 may be implemented by the cut surfaces 21.

The shield 30 is a reflective shield which reflects the light. The shield 30 is provided at a lens focal point 40 between the optic unit 10 and the lens 20. The shield 30 functions to reflect light which passes through the optic unit 10 toward the lens 20. A reflective surface which may reflect the light toward the lens 20 may be provided on a top surface of the shield 30. The reflective surface may be a flat surface.

Next, a designing process of an optical structure for a vehicle according to an exemplary embodiment of the present invention will be described.

Figure 3:
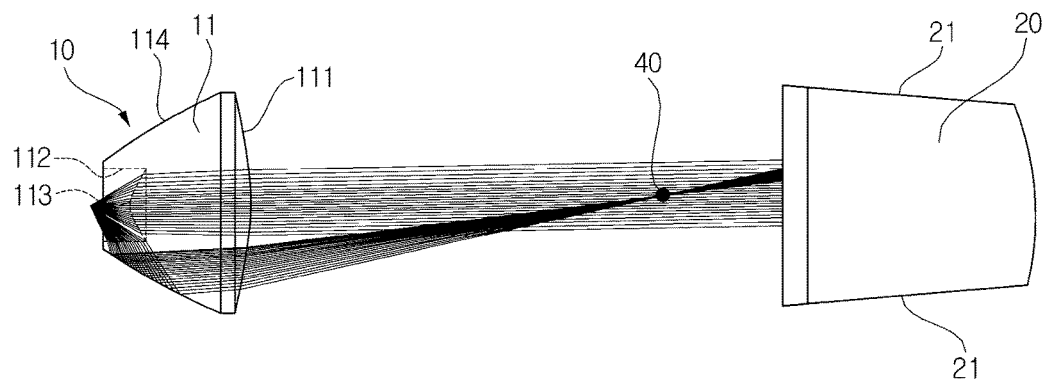
FIG. 3 is a view illustrating an optical structure for a vehicle when an optic unit is a single optic.

FIG. 3 is a view illustrating an optical structure for a vehicle when an optic unit is a single optic. As illustrated in FIG. 3, each shape of a primary optic 10 is restricted so as to cause the light to enter onto a thin aspherical lens 20 having upper and lower cut surfaces 21. As illustrated in FIG. 3, light may be caused to straightly propagate by the aspherical curve 113 and the spherical curve 111. After passing through the aspherical lens 20, the light is naturally diffused. The light may be collected to the lens focal point 40 by the Bezier curve 114 and the spherical curve 111. Such an optical structure may improve a luminous intensity of a hot zone and block light from being leaked from the lens 20.

Figure 4:
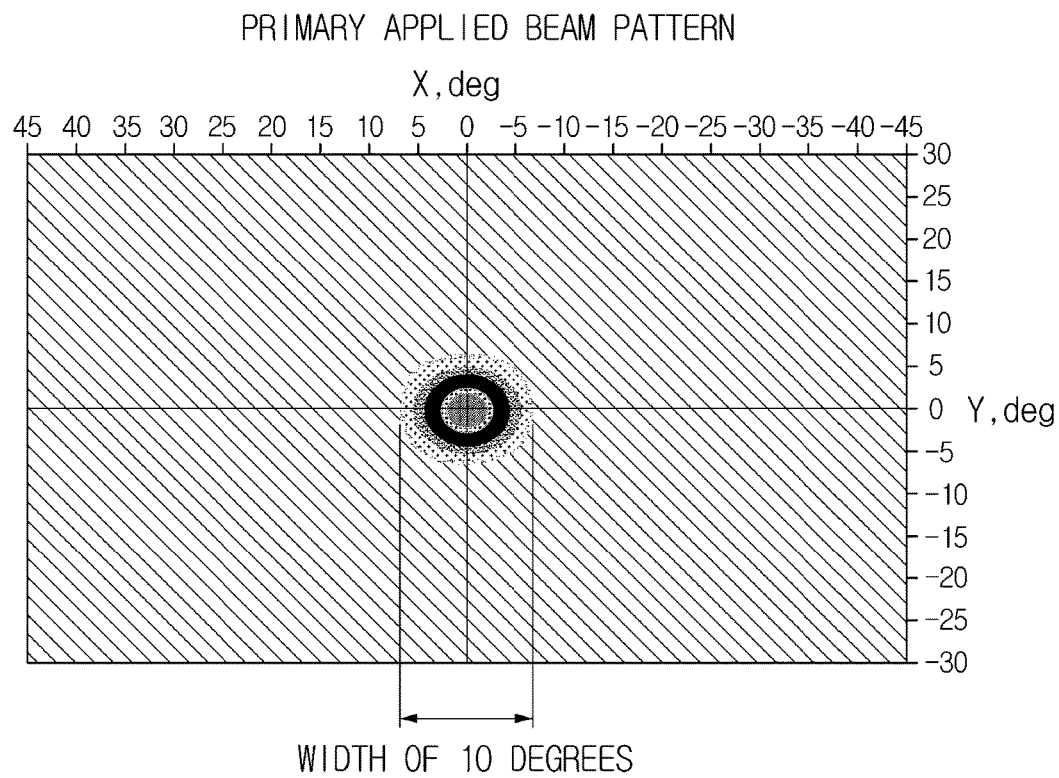
FIG. 4 is a view illustrating a beam pattern of FIG. 3.

FIG. 4 is a view illustrating a beam pattern of FIG. 3. As illustrated in FIG. 4, it is confirmed that a beam pattern having a width of 10 degrees is formed in the optical structure as illustrated in FIG. 3. As described above, since a divergence angle has a limitation of approximately 10 degrees, three optics 11 are required to form a target beam pattern having a width of 30 degrees. Accordingly, when the size (a diameter of a rear surface of the optic) of the optics exceeds 20 mm, it is difficult to implement a desired beam pattern due to the structure of the optical system. Further, it should be considered that a width of the aspherical lens 20 is 70 mm to 80 mm and a distance between lenses and a size of the lens need to be considered.

Figure 5:
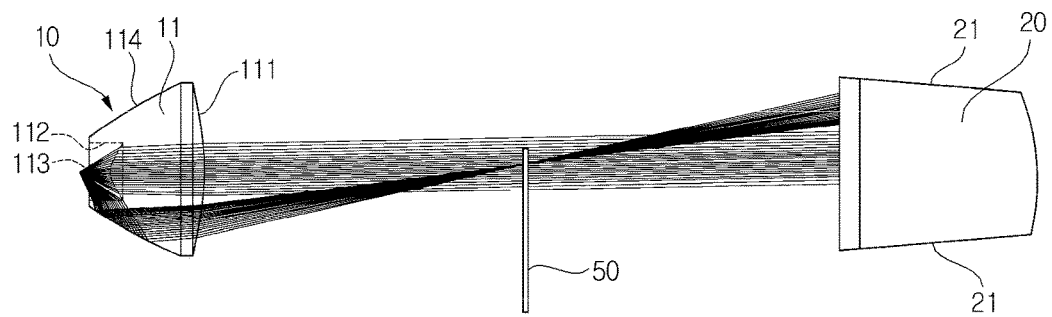
FIG. 5 is a view obtained by applying a light shielding shield to FIG. 4.

FIG. 5 is a view obtained by applying a light shielding shield to FIG. 4. FIG. 5 illustrates an optical structure in which a light shielding shield 50 is provided at the lens focal point 40 in order to form cut-off.

Figure 6:
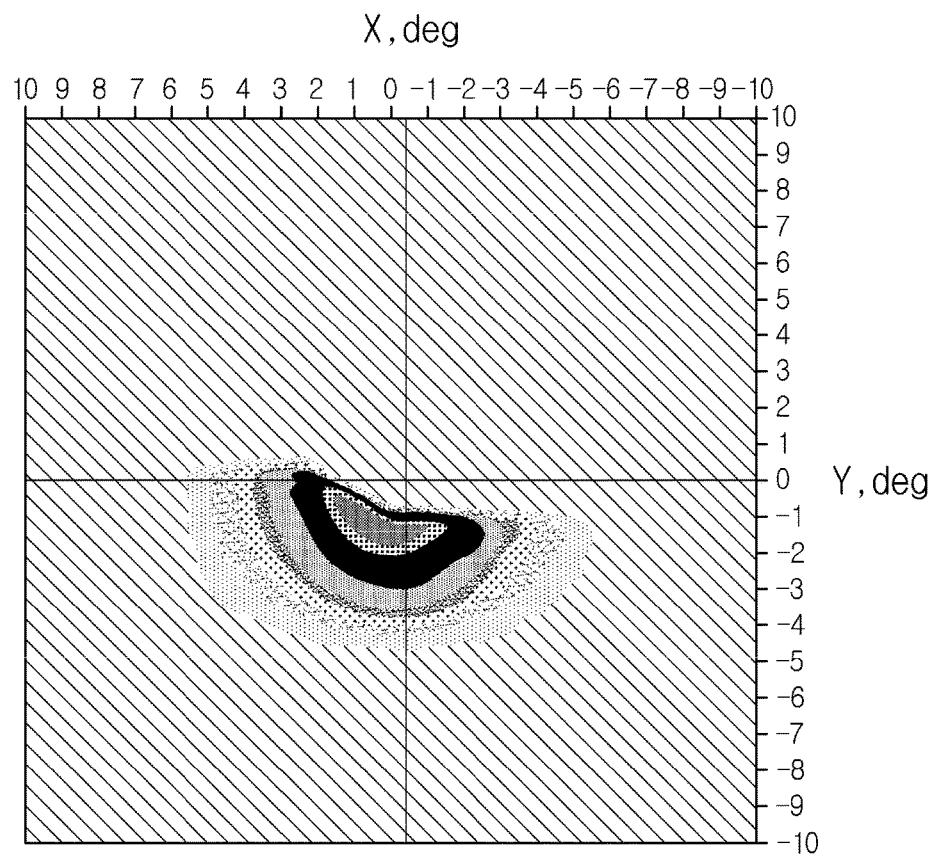
FIG. 6 is a view illustrating a beam pattern of FIG. 5.

FIG. 6 is a view illustrating a beam pattern of FIG. 5. As illustrated in FIG. 6, it is configured that the light is blocked by the light shielding shield 50 so that the efficiency is reduced.

FIG. 7 illustrates an optical structure for a vehicle according to an exemplary embodiment of the present invention in which a technical problem in the design process of FIGS. 3 to 6 is solved. As illustrated in FIG. 7, in order to implement of a target beam pattern having a width of 30 degrees, an optic unit 10 is configured by a combination of three optics 11. Further, a reflective shield 30 is provided at a lens focal point 40.

Figure 8:
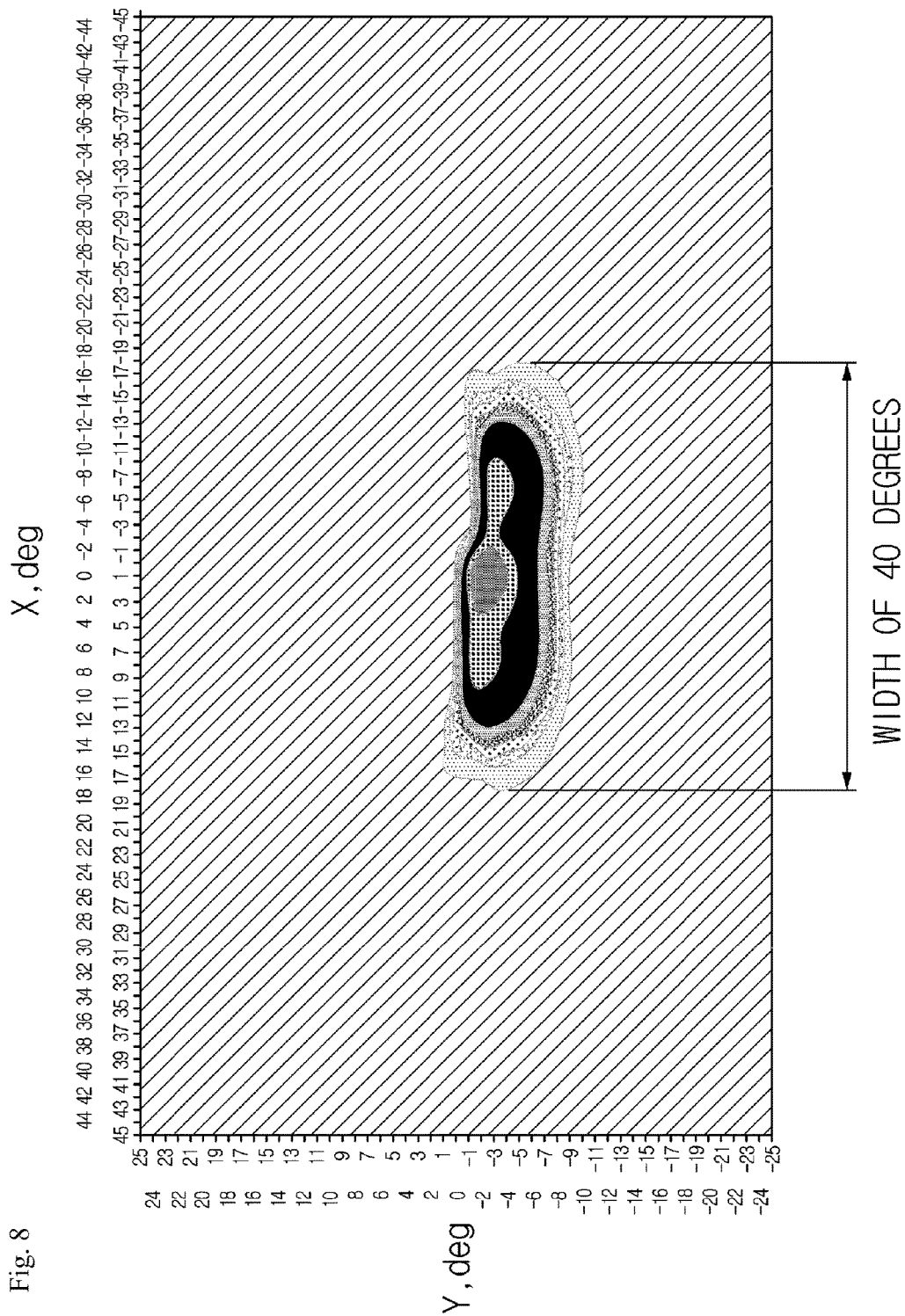
FIG. 8 is a view illustrating a beam pattern of FIG. 7.

FIG. 8 is a view illustrating a beam pattern of FIG. 7. As illustrated in FIG. 8, it is confirmed that a desired target beam pattern having a width of 30 degrees is formed in the optical structure illustrated in FIG. 7.

Figure 10:
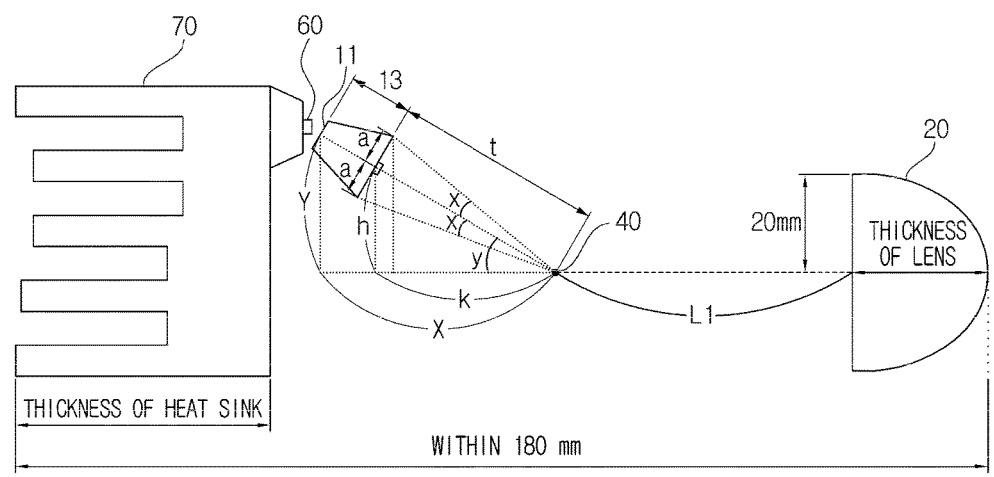
FIG. 10 is a diagram illustrating a condition of restriction in a relationship between the optic according to an exemplary embodiment of the present invention and a lens focal point.

FIG. 9 is a table for a condition of restriction in a relationship between the optic according to an exemplary embodiment of the present invention and a lens focal point. FIG. 10 is a diagram illustrating a condition of restriction in a relationship between the optic according to an exemplary embodiment of the present invention and a lens focal point.

As illustrated in FIGS. 9 and 10, the shapes of the optics 11 may be restricted so that the light enters the aspherical lens 20.

When a usage height of an aspherical lens is determined, a value of x+y may be obtained from the relationship with a focal distance L1 of the aspherical lens. y is an angle with respect to the focal surface of the aspherical lens and x+y is found by substituting the angle with a value which increases from 1 degree. In this case, y needs to be equal to or larger than x. This is because when y is smaller than x, light may be blocked by the shield.

X and Y coordinate values and a tilt angle of the optic may be known from a trigonometric function. Here, there is a limitation in the entire optical system. That is, a space in the lamp is limited and a limitation in a longitudinal direction is determined within a similar range.

Therefore, the X coordinate value is limited to 65 mm. The optic may be controlled only in the region represented by a bold line in Table of FIG. 9. When the optic is out of this range, the efficiency is lowered and adverse effect may be caused by the leaked light. The optic may be limited by X, Y, and the y value.

Finally, a total length of an optical system is 180 mm, a thickness of the lens is 25 mm, L1 is 45, a thickness of a heat sink 70 is 45 mm, a used length is 115 mm, an available length is less than 65 mm, a lens usage height (based on the focal point) is 20 mm, and x+y is 23.96249.

The X and Y coordinate values and the tilt angle of the optic of FIG. 10 may be calculated the following trigonometric function.

$$\tan x = a/t, t = a/\tan x$$

$$\sin y = h/t, h = \sin y \cdot a/\tan x$$

$$\tan y = k/h, k = h/\tan y$$

Coordinate $Y = \sin y \cdot (t+13)$ $X = \cos y \cdot (t+13)$

Relational Equation $x + y = 37$ degrees $y \geq x$

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protection scope of the present invention should be interpreted based on the following appended claims and it should be appreciated that all technical spirits included within a range equivalent thereto are included in the protection scope of the present invention.

What is claimed is:

1. An optical structure for a vehicle, comprising:
   an optic unit including a plurality of optics, each of the plurality of optics including a first surface and a second surface, the optic unit transmitting a beam pattern that has passed through the first surface of each of the plurality of optics after being reflected from the second surface of each of the plurality of optics;
   a lens disposed at a distance from the optic unit; and
   a shield disposed in an optical path between the optic unit and the lens, and which reflects the beam pattern from the optic unit through the lens,
   wherein the first and second surfaces of each of the plurality of optics focus the beam pattern on the shield at a focal point of the lens,
   wherein each of the plurality of optics includes a third surface having an asymmetric curve, the first surface having a spherical curve, the second surface having a Bezier curve, and
   wherein each of the optics receives a light beam through the third surface, reflects the light beam by the second surface, and emits the light beam through the first surface, the transmitted beam pattern including the emitted light beam.

2. The optical structure of claim 1, wherein a top surface of the shield is a reflective surface, which reflects the beam pattern from the optic unit through the lens.

3. The optical structure of claim 1, wherein the plurality of optics includes three optics that are spaced apart from each other by a distance interval.

4. The optical structure of claim 1, wherein the lens is an aspherical lens.

5. The optical structure of claim 4, wherein the lens is a semicircular aspherical lens having upper and lower cut surfaces.

6. The optical structure of claim 5, wherein a width of the lens is 70 mm to 80 mm.

7. The optical structure of claim 1, wherein each of the plurality of optics is a conical optic, and
   wherein the first surface of each of the plurality of optics is a rear surface and the third surface of each of the plurality of optics is an entrance surface.

8. The optical structure of claim 7, wherein a center of the spherical curve faces a focal point of each of the optics.

9. The optical structure of claim 7, wherein a distance between a center of the front surface and the focal point of each of the plurality of optics is determined by a value calculated by an operation.

10. The optical structure of claim 9, a calculated value of the operation is applied to a table to determine a control range of each of the plurality of optics.

11. The optical structure of claim 1, wherein a diameter of a rear surface of the optic is 20 mm.

12. The optical structure of claim 1, wherein the shield is disposed at a focal point of the optic unit.

13. The optical structure of claim 1, wherein the optical unit transmits the beam pattern as a converging beam pattern, and
    wherein the shield reflects the beam pattern as a diverging beam pattern.

14. A head lamp, including:
    a light source that produces a light beam;
    an optic unit that transmits the light beam as a beam pattern, the beam pattern being transmitted through a first surface of the optic unit after being reflected by a second surface of the optic unit;
    a lens that is spaced apart from the optic unit; and
    a shield that reflects the beam pattern produced by the optic unit through the lens,
    wherein the first and second surfaces focus the beam pattern on the shield at a focal point of the lens,
    wherein the optic unit receives the light beam through a third surface, reflects the light beam by the second surface, and emits the light mean as the beam pattern through the first surface, and
    wherein the first surface has a spherical curve, the second surface has a Bezier curve, and the third surface has an asymmetric curve.

15. The head lamp of claim 14, wherein the shield is disposed at a focal point of the optic unit.

16. The head lamp of claim 14, wherein the optical unit transmits the beam pattern as a converging beam pattern, and wherein the shield reflects the beam pattern as a diverging beam pattern.

* * * * *